United States Patent [19]

Wang

[11] Patent Number: 5,969,603

[45] Date of Patent: Oct. 19, 1999

[54] DOOR OPENING WARNING SYSTEM DEVICE FOR CARS

[76] Inventor: Chun-Chung Wang, 9, Lane 1096, Chun Jih Road, Taoyuan, Taiwan

[21] Appl. No.: 09/074,118

[22] Filed: May 7, 1998

[51] Int. Cl.$^6$ .................................................. B60Q 1/52
[52] U.S. Cl. ........................ 340/471; 340/468; 340/463; 307/10.1; 307/10.8
[58] Field of Search ................................ 340/425.5, 433, 340/463, 468, 471, 475, 476, 477, 479; 307/10.1, 10.8

[56] References Cited

U.S. PATENT DOCUMENTS

| | | | |
|---|---|---|---|
| 4,249,160 | 2/1981 | Chilvers | 340/471 |
| 4,833,448 | 5/1989 | Chang | 340/425.5 |
| 4,965,546 | 10/1990 | Chang | 340/468 |

FOREIGN PATENT DOCUMENTS

| | | |
|---|---|---|
| 40-6072236 | 3/1994 | Japan . |
| 40-6107069 | 4/1994 | Japan . |

Primary Examiner—Daniel J. Wu
Assistant Examiner—Julie B. Lieu
Attorney, Agent, or Firm—Pro-Techtor International Services

[57] ABSTRACT

A door opening warning system device actuatable when a door of a car is going to be opened, including a non-remote control type contact switch for providing a "POWER OFF" signal, a flash signal power feed controller, a contact switch for providing a "POWER OFF" signal, a flash device and warning lights. The non-remote control type contact switch may be installed at the ignition key or other suitable positions of the car. The flash signal power feed controller and the contact switch for providing the "POWER OFF" signal are connected via circuitry to the flash device and warning lights of the car. When the ignition key is turned to an "OFF" position or contact switches of other warning system devices are contacted before the driver opens the door to get off, power is connected to cause the warning lights to flash. When the doors are closed or locked, the contact switch for providing a "POWER OFF" signal will be actuated to cut off power supply. A power cut delay device may replace the non-remote control type contact switch and the flash signal power feed controller. The system device ensures the safety of the driver/passengers getting off a car and the car coming behind it.

4 Claims, 8 Drawing Sheets

DOOR OPENING WARNING SYSTEM DEVICE FOR CARS

BACKGROUND OF THE INVENTION (a) Field of the Invention

The present invention relates generally to a door opening warning system device, and more particularly to a warning system device for cars that can, when a car stops and the driver or passenger(s) in the car is/are going to open the door to get off, actuate warning lights of the car to warn the cars coming behind or driving by the sides to be watchful, so as to ensure safety.

(b) Description of the Prior Art

Cars are equipped with signal lights, blinkers, etc. to warn the other cars on the road so as to ensure road safety. However, there are not provided any lights to warn the other cars when the driver or passengers of a car is/are going to open the door of the car to get off. Besides, when a car stops at one side of the road and the ignition key is turned to an "OFF" position, all electric power supply to the car is cut off so that all lighting systems of the car are automatically closed. Without any warning lights to warn the cars, motorcycles or bicycles coming behind or passing by the sides of the car, accidents may occur when the driver/passenger of the car stopped at one side of the road opens the door to get off. It is imperative that door opening warning lights be provided.

In the prior art, the blinkers or the warning lights on the car's door will start flashing when the door is being opened. But these lights will be actuated only when the doors are opened which would be too late if the vehicles coming behind are driving at a high speed.

SUMMARY OF THE INVENTION

A primary object of the present invention is to provide a warning light device which, when a car stops at the side of the road and the ignition key is turned to an "OFF" position or pulled out, the device will be actuated and be "ON" for an interval of time before it is automatically turned off or when the door is closed again or locked to save the car's electric power supply.

Another object of the present invention is to provide a warning system device which, when a car stops at the side of the road and the engine stops, the signal lights or blinkers on one side or both sides of the car will automatically flash for a brief interval of time (about 0.5–1 min.) before they automatically stop or when the door is closed again.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
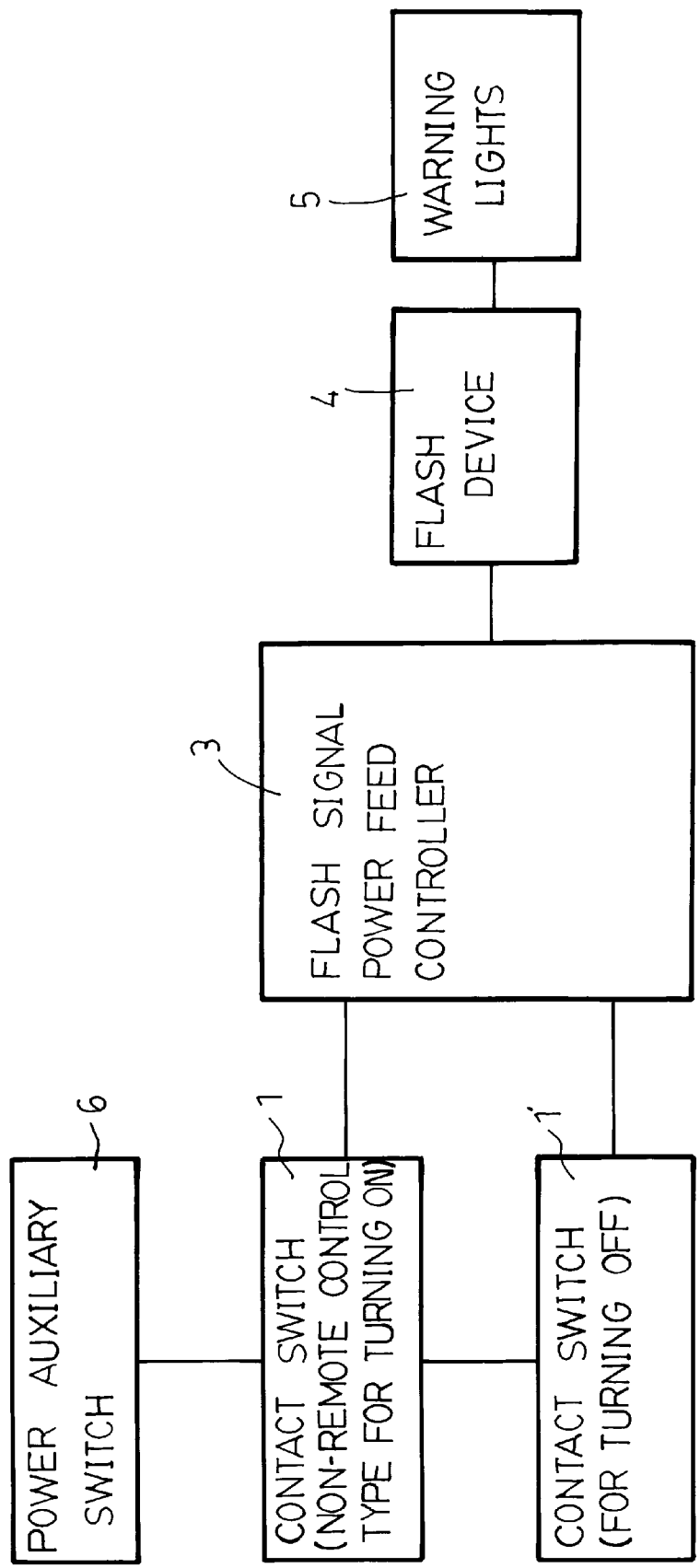
FIG. 1 is a schematic block diagram of the present invention.

With reference to FIGS. 1, 4–6, and 13, the present invention comprises a power-on non-remote control type first contact switch 1 and a second contact switch 1' adapted to provide power-off signals, a flash signal power feed controller 3, a flash device 4, warning lights 5, and a power auxiliary switch 6.

The power-on non-remote control type first contact switch 1 may be mounted at the ignition key on the steering wheel, or an automatic switch control at the driving side, the gear shift lock, or steering stick, etc. When the driver turns the ignition to an "OFF" position or pulls out the ignition key and actuates the contact switch 1, a start signal will be transmitted to the flash signal power feed controller 3 to turn on power so that the warning lights 5 start flashing. On the other hand, the (second contact switch 1) is installed at the door or other positions. When any door of the car is opened and then closed, or when the door is closed manually or by use of a remote-controller, an "OFF" signal will be sent to the flash signal power feed controller 3 to turn off the flash signal power, thus achieving electricity economy.

The non-remote control type first contact switch 1 is mounted in communication with the ignition key, typically on the steering column. The second contact switch 1' used for the turning off of flash signal power may, however, include all non-remote control ones and remote control ones, since the driver often uses a remote controller to lock the doors after getting off the car.

Figure 2:
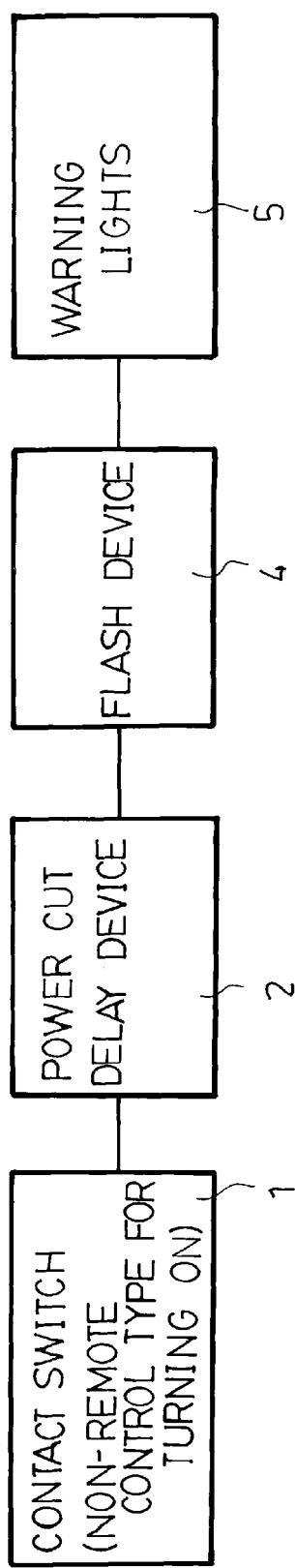
FIG. 2 is another schematic block diagram of the present invention.
Figure 3:
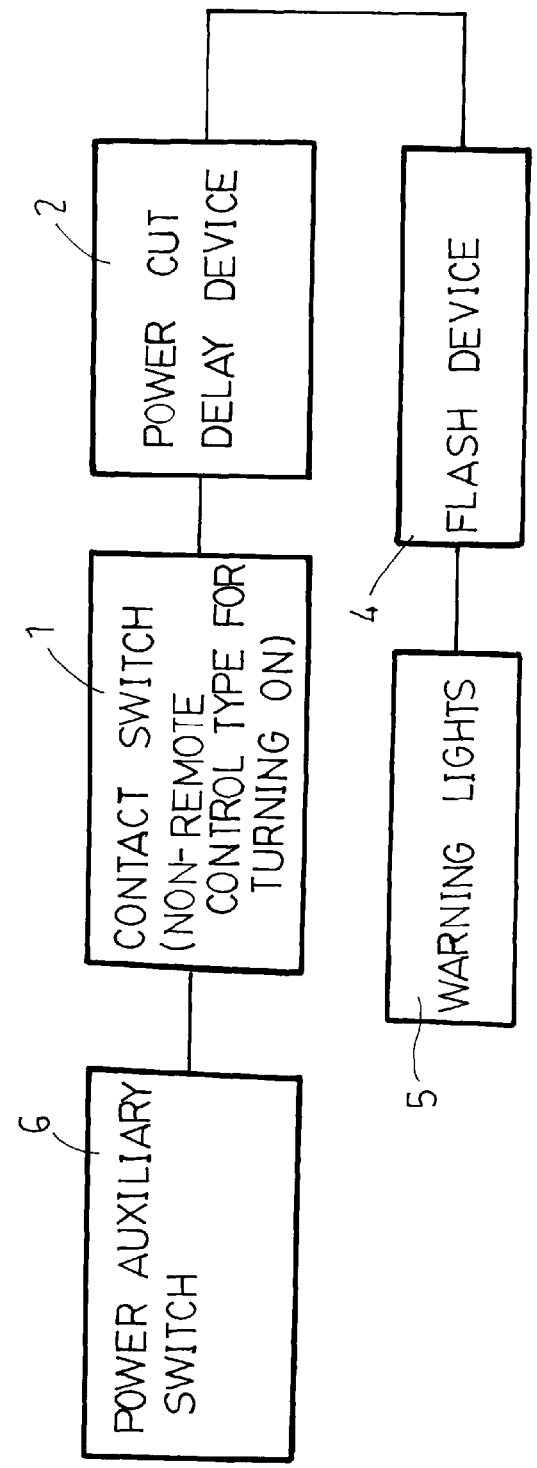
FIG. 3 is a further schematic block diagram of the present invention.
Figure 4:
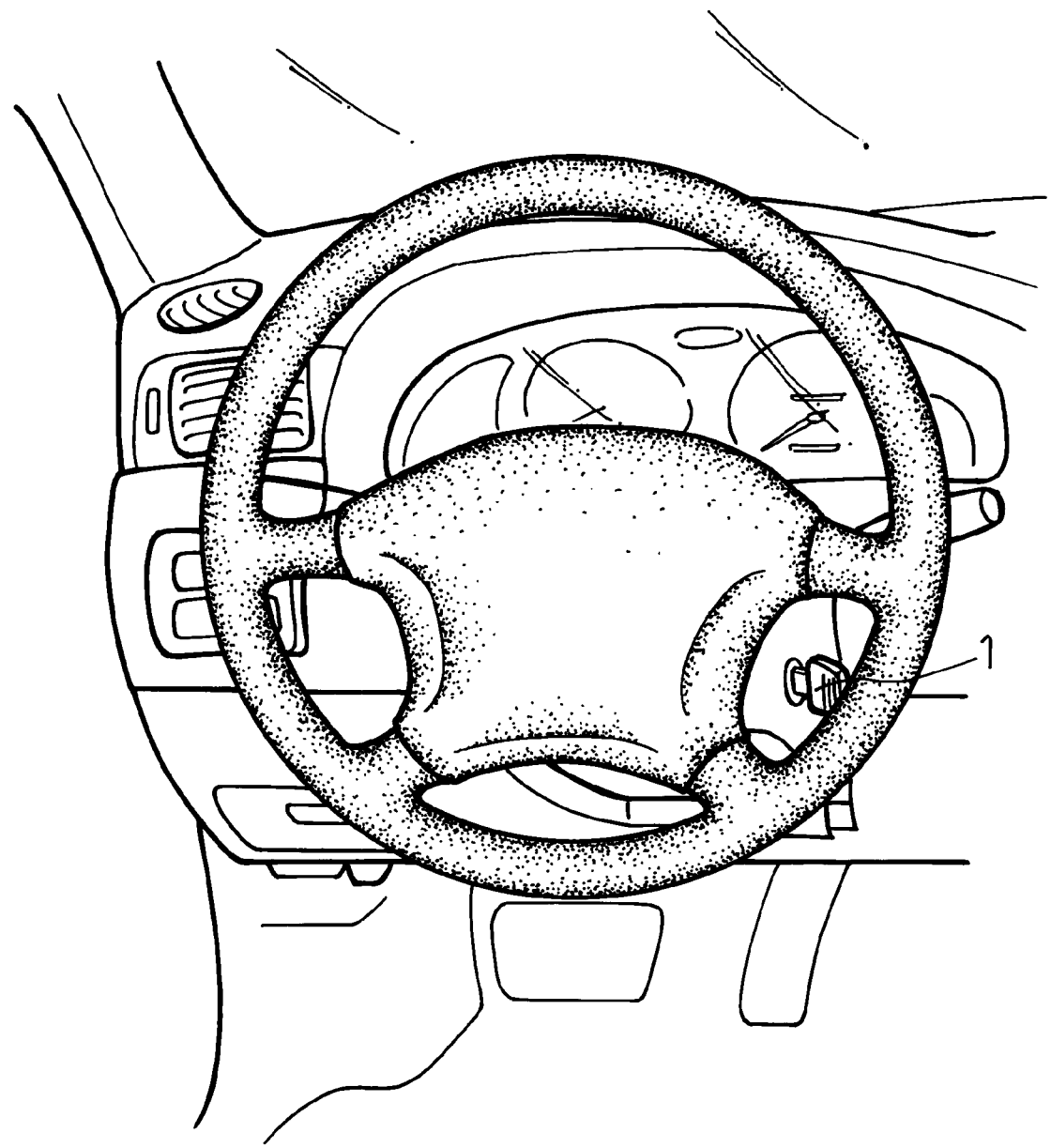
FIG. 4 is schematic view illustrating the contact switch device according to the present invention installed at the ignition key.
Figure 5:
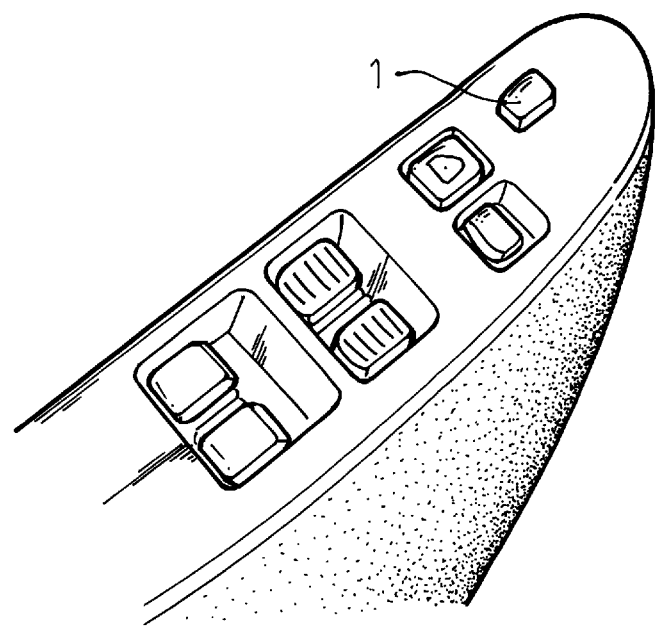
FIG. 5 is a schematic view illustrating the contact switch device according to the present invention installed at the driving side.
Figure 6:
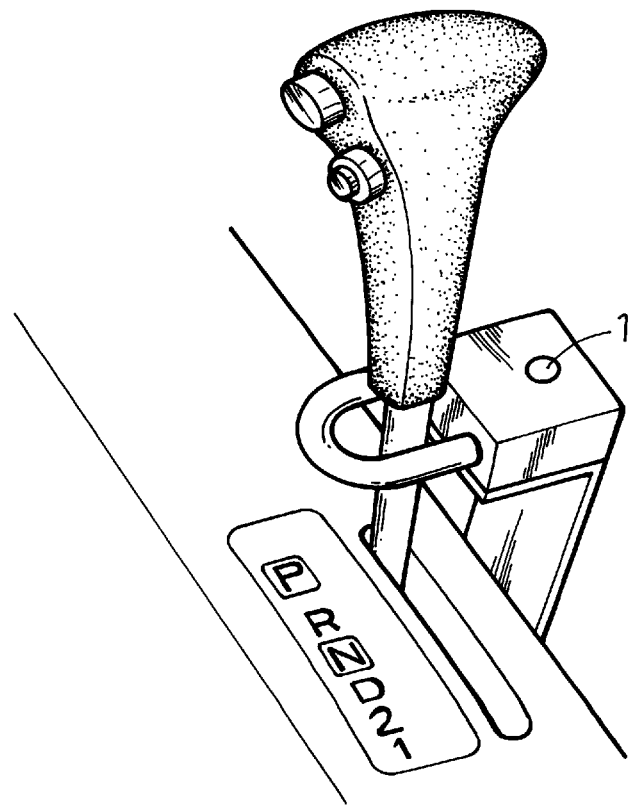
FIG. 6 is a schematic view illustrating the contact switch device according to the present invention installed at the gear shift.
Figure 7:
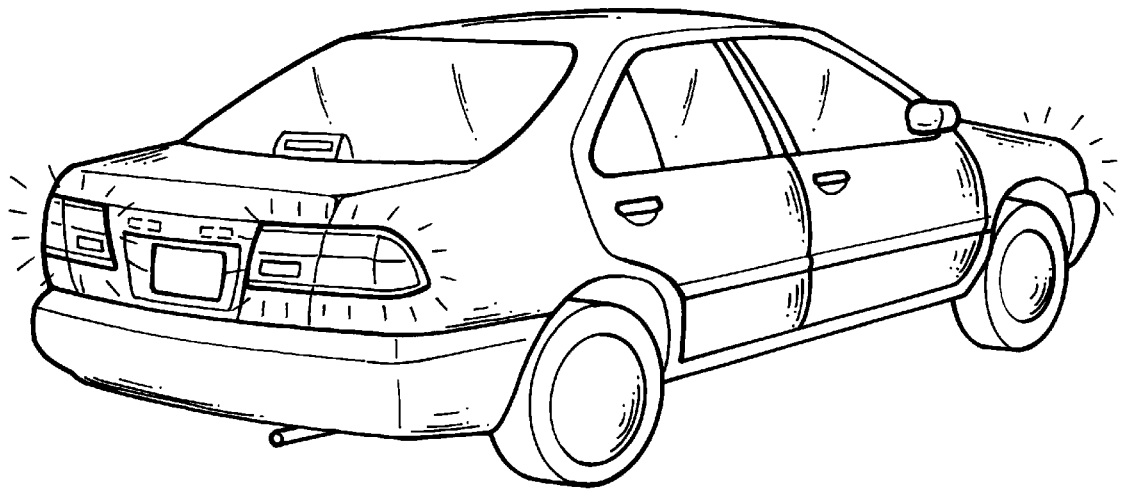
FIG. 7 is a schematic view illustrating that all the signal lights of the car are caused to flash.
Figure 8:
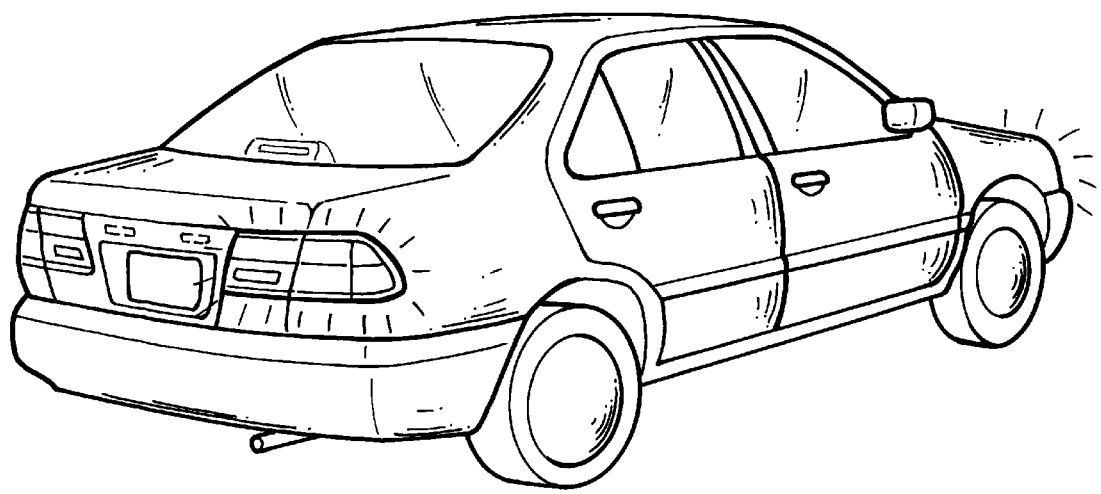
FIG. 8 is a schematic view illustrating that the signal lights on the right side of the car are caused to flash.
Figure 9:
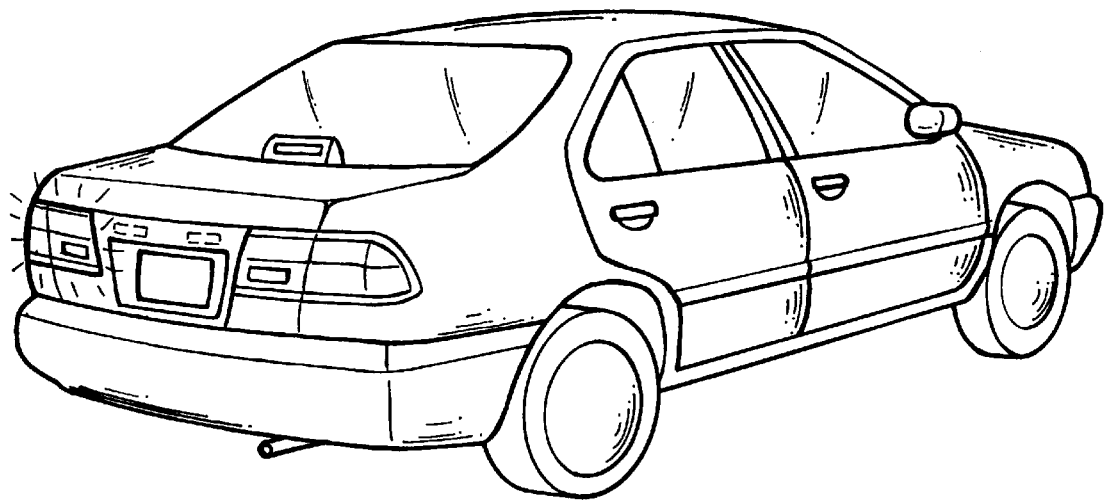
FIG. 9 is a schematic view illustrating that the signal lights on the left side of the car are caused to flash.
Figure 10:
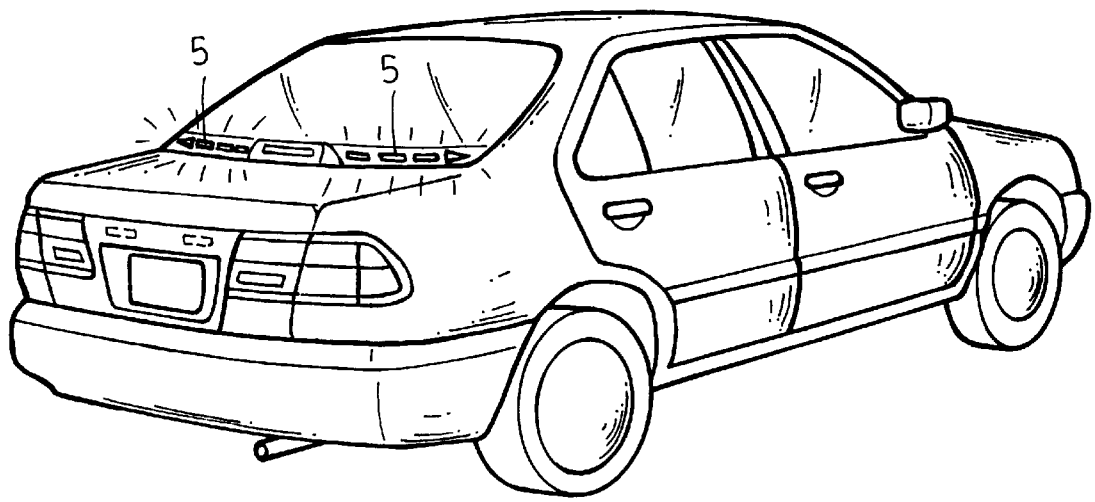
FIG. 10 is a schematic view illustrating that the warning lights on both sides flash in warning.
Figure 11:
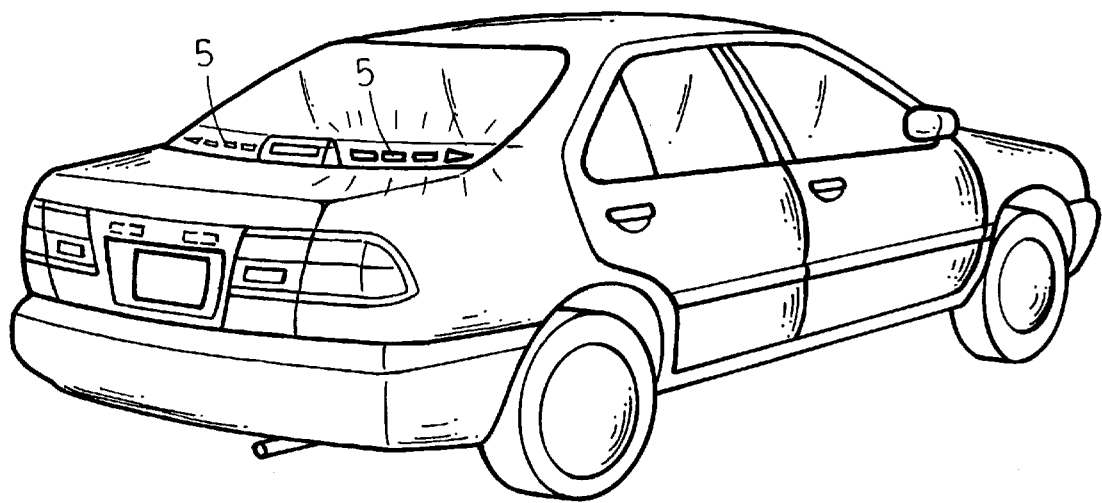
FIG. 11 is a schematic view illustrating that the warning lights on the right side flash in warning.
Figure 12:
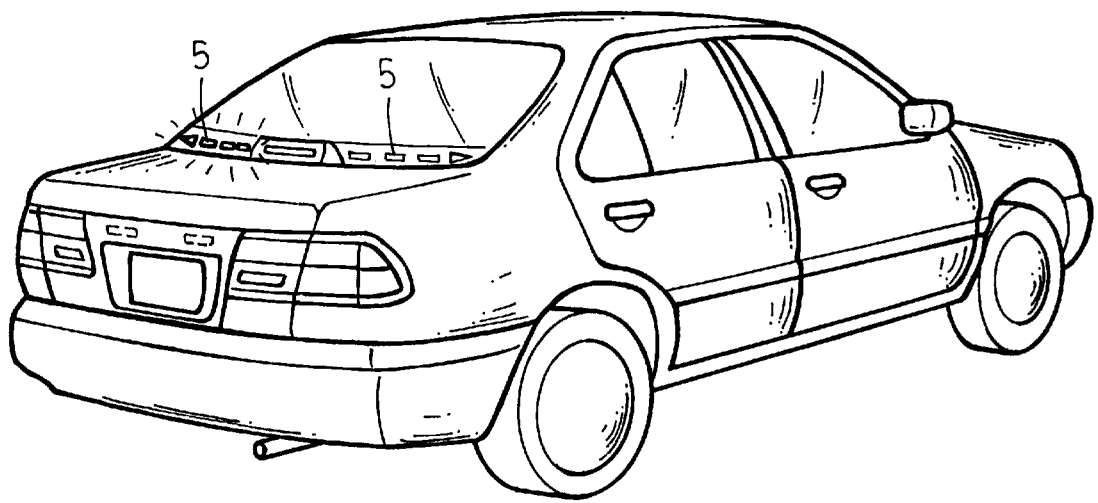
FIG. 12 is a schematic view illustrating that the warning lights on the left side flash in warning.
Figure 13:
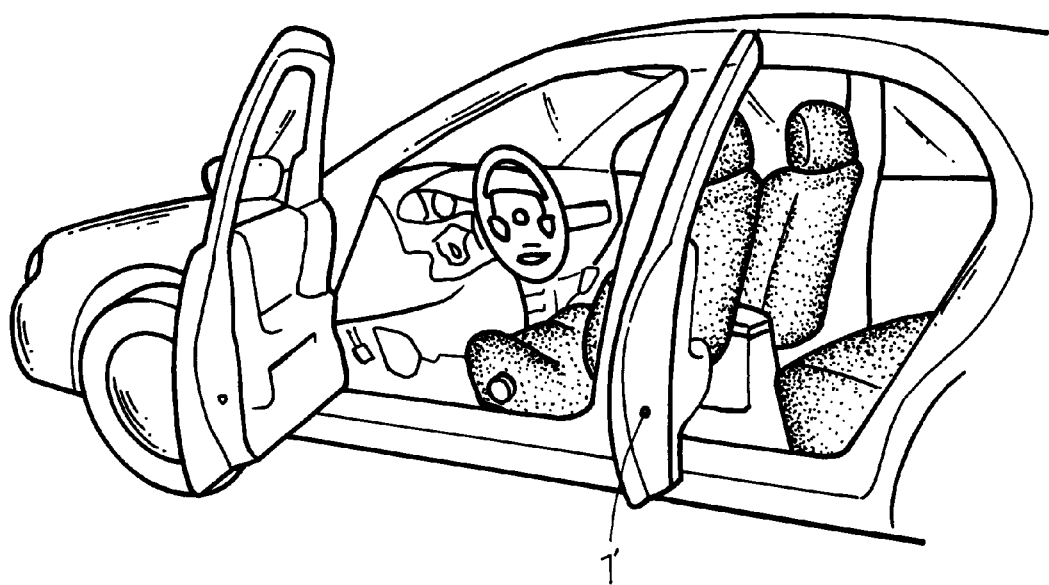
FIG. 13 is a schematic view illustrating that the contact switch for disconnecting power supply is installed at the door of the car.

Referring to FIGS. 2 and 3, the flash signal power controller 3 and the second contact switch 1' for turning off power signals may be replaced by a delay power cut device, and the contact switch 1 for starting power may still be mounted in communication with the ignition key. In this embodiment, the present invention includes a power cut delay device 2 installed inside the car at an appropriate position in a concealed manner, and having circuits connected to a flashing device 4 on the car and warning lights 5. When ignition is off by turning the ignition key to an "OFF" position or removing the key, or when the shift gear is locked, or when the steering stick is moved, the contact switch 1 will be actuated so that the signal lights will automatically be "ON". The lights will be "OFF" after an interval of time the driver needs to leave the car. Power economy is therefore ensured. Referring to FIGS. 2 and 3, the power auxiliary switch 6 may be further included in the device of the present invention to cut off the power supply before all the passengers get off the car and the power of the car has been turned off, so that the warning lights 5 will not flash.

Referring to FIG. 1, the door opening warning system device with a non-remote control type contact switch which is mounted in communication with the ignition key, a flash signal power controller, and at least one contact switch for providing the "POWER OFF" signal additionally installed on the car's doors may be directly installed in the car to connect the flash device and the warning lights during manufacturing of the car.

Referring to FIGS. 2–3, the door opening warning system with a non-remote control type contact switch mounted in communication with the ignition key and the power cut delay device may also be directly installed in the car to connect the flash device and the warning lights during manufacturing of the car.

Referring to FIGS. 7–12, when the device of the present invention is actuated, all the signal lights on the car body will be turned on, the rear lights at the left or the right will be turned on, or the signal lights at both sides will be turned on simultaneously, to inform the car coming behind that someone is going to open the door to get off. Warning lights 5 may further be installed at both sides of the third brake light to achieve the same warning effects to prevent collision with the car behind when the door is opened.

Although the present invention has been illustrated and described with reference to the preferred embodiment thereof, it should be understood that it is in no way limited to the details of such embodiment but is capable of numerous modifications within the scope of the appended claims.

What is claimed is:

1. A car door opening warning system device adapted to give a warning signal that a car door is to be opened comprising:

a contact switch that supplies a "POWER ON" signal, a flash signal power feed controller, at least one contact switch to provide a "POWER OFF" signal, a flash device, and warning lights; whereby when said contact switch is actuated by a user turning an ignition key to an off position, said flash signal power feed controller turns on a power supply to cause said warning lights to flash, and when the car door is closed or locked, said at least one contact switch is actuated to cause said flash signal power feed controller to cut off said power supply so that said warning lights cease to flash.

2. The car door opening warning system device as defined in claim 1, wherein:

said flash signal power feed controller comprises a timing device whereby when said warning system is actuated, a signal is generated to actuate said warning lights to flash for a predefined interval of time.

3. A car door opening warning system device adapted to give a warning signal that a car door is to be opened comprising:

a contact switch that supplies a "POWER ON" signal, a flash signal power feed controller, at least one contact switch to provide a "POWER OFF" signal, a flash device, and warning lights; whereby when said contact switch is actuated by a user removing an ignition key from an ignition switch of the car, said flash signal power feed controller turns on a power supply to cause said warning lights to flash, and when the car door is closed or locked, said at least one contact switch is actuated to cause said flash signal power feed controller to cut off said power supply so that said warning lights cease to flash.

4. The car door opening warning system device as defined in claim 3, wherein:

said flash signal power feed controller comprises a timing device whereby when said warning system is actuated, a signal is generated to actuate said warning lights to flash for a predefined interval of time.

* * * * *